United States Patent [19]

Hinojosa

[11] 4,004,666
[45] Jan. 25, 1977

[54] REVERSIBLE SOCKET WRENCH

[75] Inventor: Carlos R. Hinojosa, Camuy, P.R.

[73] Assignee: Besenbruch-Hofmann, Inc., Lindenhurst, N.Y.

[22] Filed: Oct. 23, 1975

[21] Appl. No.: 624,787

[52] U.S. Cl. .................................. 192/44; 81/59.1
[51] Int. Cl.² ......................................... F16D 41/08
[58] Field of Search ............. 192/44; 81/59.1, 63.1

[56] References Cited

UNITED STATES PATENTS

| 1,859,600 | 5/1932 | Prettyman | 192/44 X |
| 2,707,540 | 5/1955 | Morris | 192/44 X |
| 2,722,149 | 11/1955 | Henley | 192/44 X |
| 3,362,267 | 1/1968 | Rozmus | 192/44 X |

*Primary Examiner*—Allan D. Herrmann
*Attorney, Agent, or Firm*—Edward H. Loveman

[57] ABSTRACT

A reversible wrench has a handle integral with a ring shaped head. A reversing mechanism in the head includes a cup shaped member rotatable on a cam block carrying a tool holder. A rotatable control plate on the head has a depending pin engaged in a slot in an end wall of the cup shaped member. The cam block has an upstanding pin engaged in another slot in the end wall and contacting a leaf spring carried by the control plate. Slots in a cylindrical wall of the cup shaped member carry rollers adjacent the cam faces of the cam block. A finger grip on the control plate facilitates rotation of the control plate and rotation of the cup shaped member and rollers on the cam block to effect reversing action between the wrench head and the tool holder.

10 Claims, 16 Drawing Figures

U.S. Patent   Jan. 25, 1977   Sheet 3 of 3   4,004,666
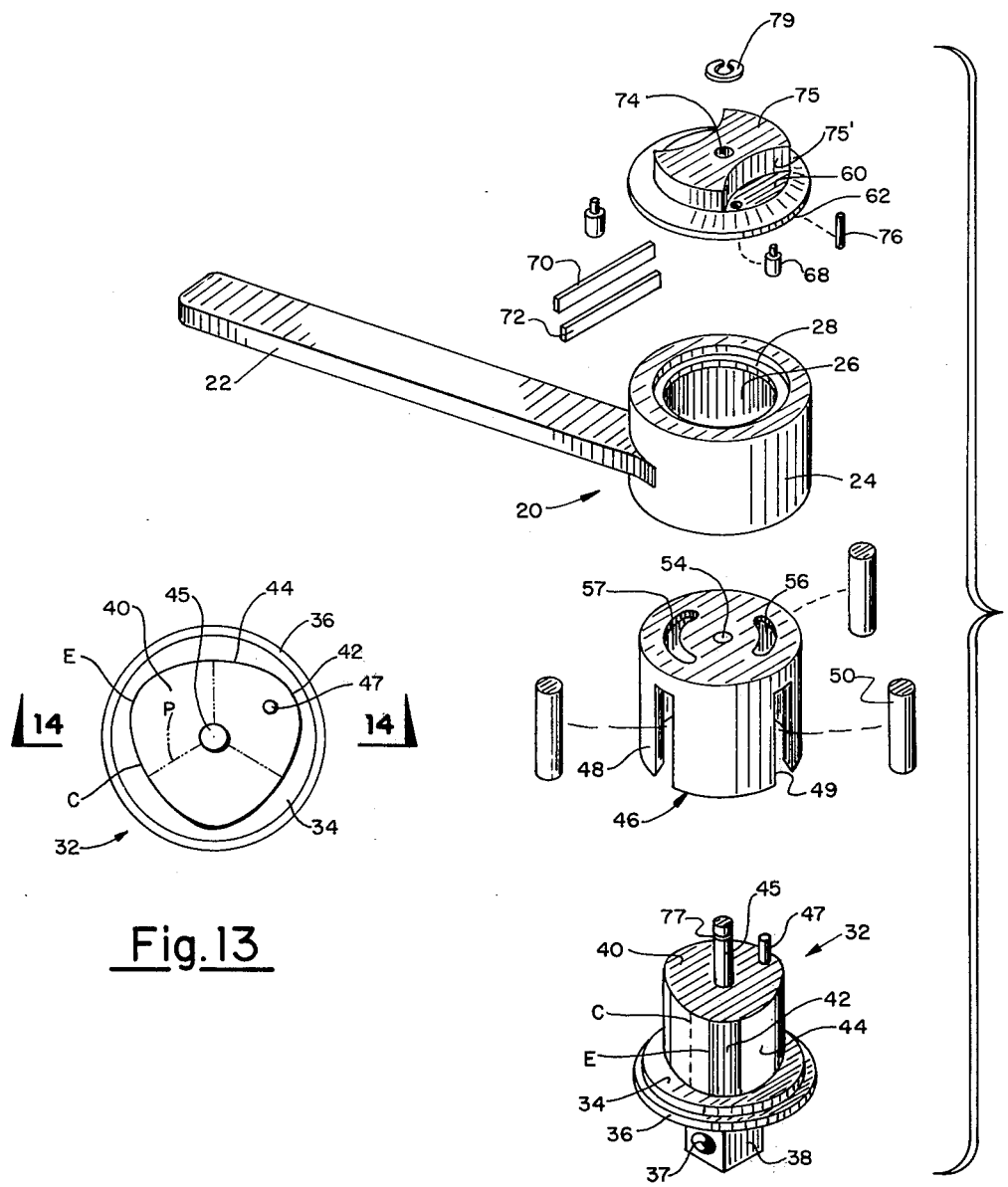
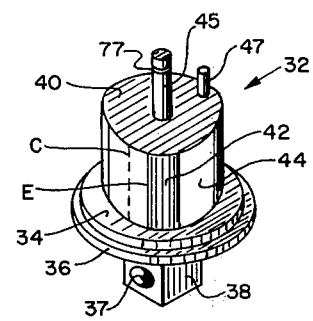
Fig. 8
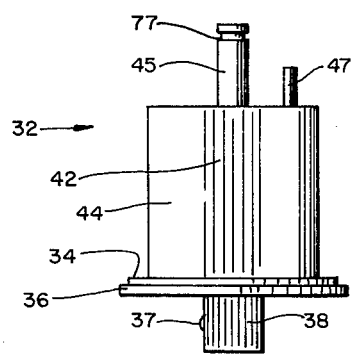
Fig. 13
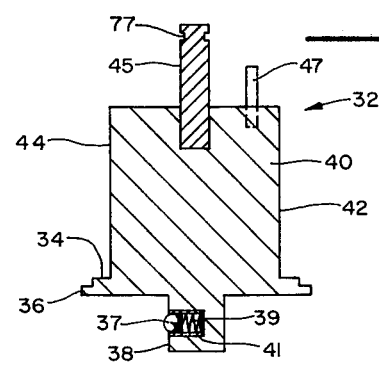
Fig. 15   Fig. 14

REVERSIBLE SOCKET WRENCH

This invention relates to wrenches and more particularly relates to reversible socket wrenches.

Reversible socket wrenches heretofore known generally employ a ratchet and pawl arrangement. This type of wrench has the disadvantage of having to turn a discrete angle to engage the next notch of the ratchet and pawl mechanism. Another type of reversible wrench such as that described in U.S. Pat. No. 3,621,739 employs a central cylindrical member releasably locked by rollers wedged between the cylindrical member and cam surfaces outside of the rollers. The rollers are held in place by a coil spring. Reversing is effected by an external control ring.

The present invention is directed to a reversible socket wrench employing wedge rollers. The wrench mechanism is simpler in construction than that of prior wrenches. The wrench head may be smaller in size because it does not employ an outer rotatable control ring for reversing. Instead a finger grip control handle is mounted at one side of wrench head opposite a tool holder. Inside the ring shaped wrench head is a cylindrical cup carrying wedge rollers. The rollers bear against the inside of the wrench head and against camming surfaces of the tool holder, so that the wrench head and tool holder rotate as a unit or turn freely depending on the direction the wrench head is rotated. By turning the control handle to either of two positions, the inside cup turns to reposit on the rollers circumferentially of the wrench head with respect to the camming surfaces, thereby reversing the action of the wrench. The inside cup is held in place by leaf springs, and the cup in turn holds the rollers in place.

Accordingly, it is a principal object of the present invention to provide a reversible wrench which is simpler in construction than prior reversible wrenches.

It is another object of the present invention to provide a reversible wrench with a wrench head which operates through a rotational range of 360°.

It is still another object of the present invention to provide a reversible wrench with a simpler and easy operating reverse control means.

It is yet another object of the present invention to provide a reversible wrench which is releable in operation and economical to manufacture.

These and other objects and many of the attendant advantages of this invention will be readily appreciated as the same becomes better understood by reference to the following detailed description when considered in connection with the accompany drawings in which:

FIG. 8 is an exploded perspective view of parts of the wrench assembly;

FIG. 13 is a top plan view of the tool holder and associated cam block;

FIG. 14 is an axial sectional view taken along line 14—14 of FIG. 13;

FIG. 15 is a side elevational view of the tool holder and cam block; and

Figure 1:
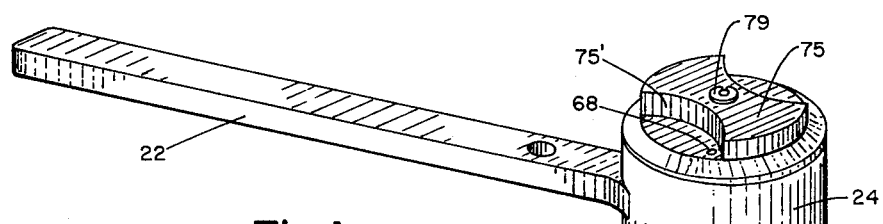
FIG. 1 is a perspective view of a reversible socket wrench embodying the present invention.
Figure 2:
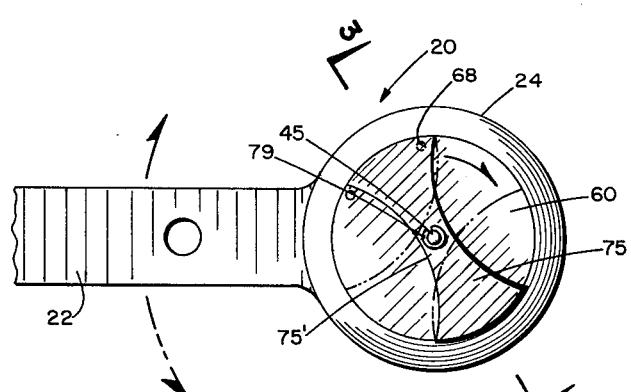
FIG. 2 is a top plan view of a portion of the wrench including the wrench head and part of the wrench handle.
Figure 9:
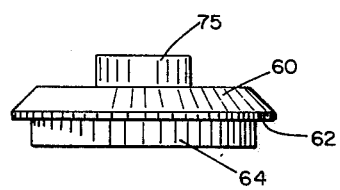
FIG. 9 is a side elevational view of the reverse control handle and control plate.
Figure 10:
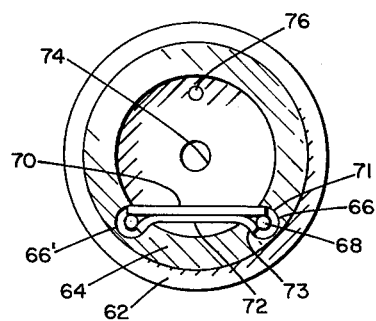
FIG. 10 is a bottom plan view of the control plate.
Figure 3:
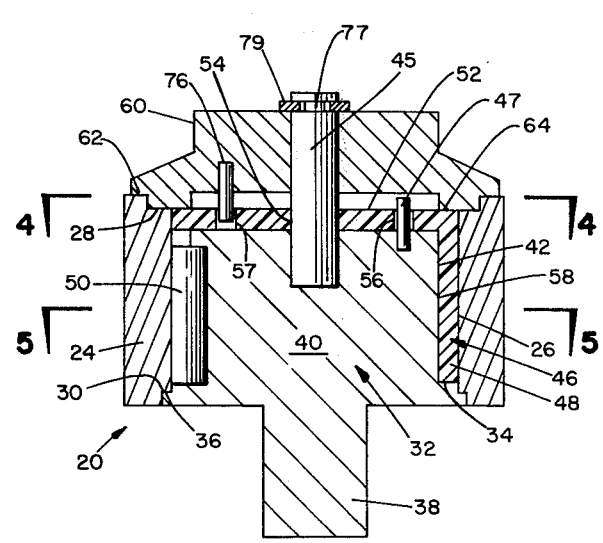
FIG. 3 is a vertical diametral cross sectional view on an enlarged scale taken along line 3—3 of FIG. 2.

Referring now to the drawings wherein like reference characters designate like or corresponding parts throughout, there is illustrated in FIGS. 1–8, a wrench assembly generally designated as reference numeral 20 having an elongated handle 22 one end of which is integral with a ring shaped head 24. The head 24 has a smooth inner cylindrical bore 26 formed with enlargements at opposite ends defining shoulders 28 and 30, respectively; see FIGS. 3 and 8. Rotatably mounted in the wrench head 24 is a body member generally designated as reference numeral 32 formed with an annular flange 34 which seats snugly inside the bore 26 and has a lip 36 which abuts the shoulder 30. The body member 32 has an integrally formed tool holder 38 which may be square in cross section and which depends axially from the wrench head 24. The tool holder 38 has a conventional ball 37 and a spring 39 trapped in a recess 41 to engage a tool on the tool holder 38; see FIG. 14. Extending axially above the flange 34 of the body 32 is a cam block 40 which has three equally spaced cylindrically curved faces 42. The cam block 40 has three other equally spaced larger flatter cam faces 44 alternating with the faces 42 and having a larger radius of curvature; see FIGS. 5, 7, 8 and 13–16. Extending axially upward from the flat top of the cam block 40 is a central shaft 45. Radially spaced from the shaft 45 is a short pin 47.

Superimposed on and surrounding the cam block 40 is a rigid, aluminum cup shaped member 46 which has a cylindrical wall 48 formed with three axially extending circumferentially spaced slots 49 formed with outwardly tapering or beveled sides; see FIGS. 5, 7, 8, 11 and 12. Each of the slots 49 receive a rotatable cylindrical cam roller 50. Since the sides of the slots 49 taper outwardly, and their minimum outer spacing is smaller than the diameters of the rollers 50, the rollers 50 are held rotatably in the slots 49 adjacent the cam faces 44. The member 46 has a circular top wall 52 formed with a central hole 54 through which the shaft 45 extends. A short curved slot 56 in the wall 52 is spaced radially from the hole 54 and receives the pin 47. The member 46 is rotatable with respect to the cam block 40 but rotation is limited by the length of the slot 56. Another curved slot 57 longer than the slot 56 is diametrically opposite therefrom in the wall 52.

The radius of curvature of the cam faces 42 is slightly smaller than an inside bore 58 (FIG. 12) of the cylindrical wall 48. The cam faces 44 have a larger radius of curvature so that they are flatter. Center lines C of the cam 44 at ends of radial planes P are normally spaced from the bore 58 but the lateral edges E of the adjoining faces 42 approach and are closely spaced from the bore 58; see FIGS. 5, 7, 8, 13, and 15.

Overlaying the wrench head 24 and rotatable with respect thereto is circular control plate 60 which has an outer annular flange 62 to seat on the top of the wrench head 24. A depending circular rail 64 seats on the shoulder 28 and extends radially inward around the peripheral edge of the circular wall 52; see FIGS. 3, 8, 9 and 10. The rail 64 is formed with two spaced circular recesses or notches 66 in each of which is centered a pin 68. A first leaf spring 70 extends across the bottom of the plate 60 and is engaged at its ends between the pins 68 and adjacent the edges 71 of the notches 66. Another leaf spring 72 abuts the outer side of the spring 70 and is engaged at its ends between the pins 68 and adjacent the edges 73 of the notches 66.

Figure 4:
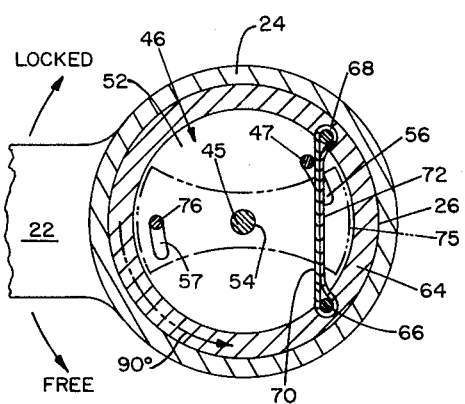
FIG. 4 and FIG. 5 are horizontal cross sectional views taken along lines 4—4 and 5—5 respectively of FIG. 3.
Figure 6:
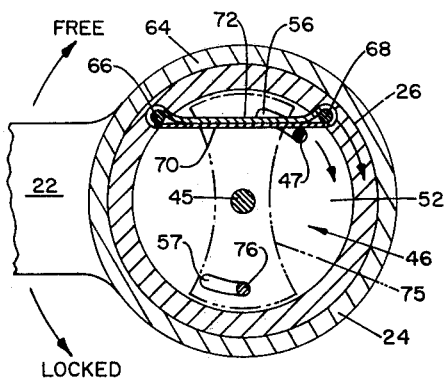
FIG. 6 and FIG. 7 are sectional views similar to FIGS. 4 and 5 respectively showing the parts in different positions to effect reversing of the wrench.

Plate 60 has a central hole 74 through which the shaft 45 extends. This shaft extends above a finger grip handle 75 at the top of plate 60. The handle has sides 75' to facilatate gripping the handle 75 and turning the plate 60. The shaft 45 is formed with a circumferential slot 77 which receives a spring washer 79. The washer holds the plate 60 rotatably on the wrench head 24. A pin 76 is radially spaced from the central hole 74 and is set in the plate 60. The pin 76 depends from the plate 24 and fits into the slot 57 in the wall 52 of the rotatable cup shaped member 46. When the control plate 60 is turned about 90° in one direction or the other, the pin 76 in the slot 57 turns the cup shaped member 46 only about 20° with respect to the cam block 40 and the wrench head 24, because rotation of the member 46 is limited by the travel of the pin 47 in the short slot 56. Rotation of the control plate 60 is limited to about 90° because the pin 47 abuts the spring 70 in each of the two rotational positions of the control plate 60 as shown in FIGS. 4 and 6 respectively. The angular rotation of plate 60 is about equal to the angular length of the slot 56 plus the angular length of the slot 57.

Figure 5:
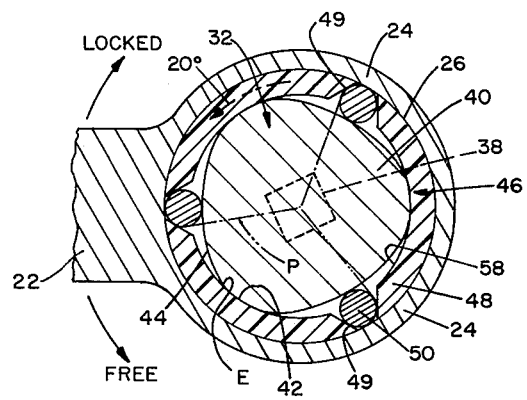

In operation of the wrench 20, when the control plate 60 is in the position shown in FIG. 4, the cam wedge rollers 50 are spaced slightly clockwise from central planes P shown in FIG. 5. Then the handle 22 and the wrench head 24 can be rotated freely counterclockwise with respect to the member 32 because the spacing between the cam faces 44 and the bore 25 will exceed the diameters of the rollers 50. If the wrench head 24 is then rotated clockwise the cam wedge rollers 50 will be cammed clockwise to lock the wrench head 24 with the cam faces 44 so that member 32 will form a unit with the wrench head 24 to rotate together and perform wrenching action.

Figure 7:
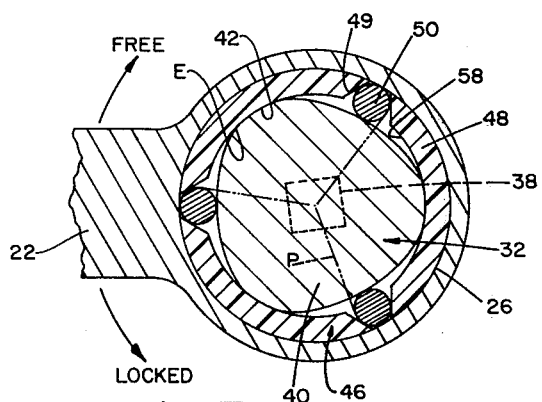
Figure 11:
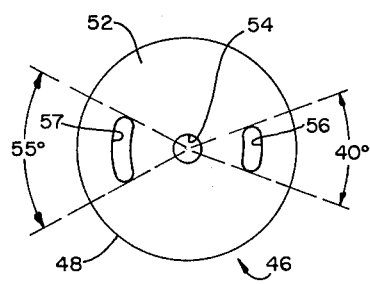
FIG. 11 is a top plan view of the cup which carries the wedge rollers and forms part of the reversing mechanism.
Figure 12:
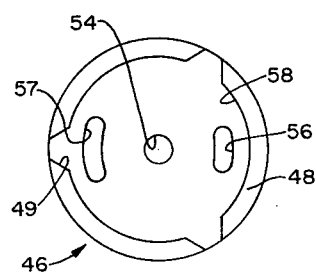
FIG. 12 is a bottom plan view of the cup.
Figure 16:
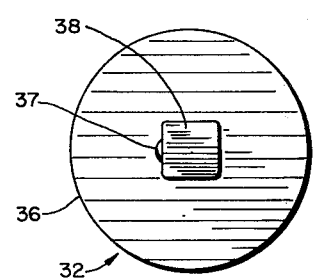
FIG. 16 is a bottom plan view of the tool holder.

If the reverse control handle 75 and the control plate 60 are turned about 90° counterclockwise from the position of FIG. 4 to the position of FIG. 6 as shown by arrows in FIG. 4, the cup 46 will be turned counterclockwise about 20° to carry the cam rollers 50 to a position just counterclockwise of center planes P of the cam block 40 as shown in FIG. 7. Then the wrench head 24 can be turned clockwise freely. The wrench head 24 will be locked by the cam rollers 50 with the member 36 if the wrench head 24 is then turned counterclockwise to perform wrenching operation reverse from that employed in FIGS. 4 and 5. It will be noted that the pin 47 bears against the leaf spring 70 in either of its two positions shown in FIGS. 4 and 6. In reversing wrench operation the pin 47 slips along the spring 70 which flexes outwardly along with the spring 72, in a detent action so that the pin 47 assumes the position of either FIG. 4 or FIG. 6 while the springs 70 and 72 are relaxed. This slippage of the pin 47 along the spring 70 enables the reverse control plate 60 to turn about 90° while the cup member 46 turns only 20°.

It should be understood that the foregoing relates to only a preferred embodiment of the invention, and that it is intended to cover all changes and modifications of the example of the invention herein chosen for the purpose of the disclosure, which do not constitute departures from the spirit and scope of the invention.

What is claimed is:

1. A reversible wrench, comprising:
   a ring shaped head;
   a cup shaped member having a cylindrical wall rotatable axially in said head, said wall having a plurality of spaced slots therein;
   a cam block rotatably disposed inside said cup shaped member, said block having a plurality of circumferentially spaced cam faces adjacent to said slots;
   a plurality of cam wedge rollers rotatably engaged in said slots between said cam faces respectively and said head;
   a reverse control plate rotatably mounted at one axial end of said head, said plate having a depending pin, said cup shaped member having an end wall overlaying said cam block, said end wall having another slot for receiving said pin, so that rotation of said control plate rotates said member and rollers to either of two set positions on said cam block, whereby when said member is turned to one position on said cam block said rollers are cammed to engage said cam faces and said head so that said head is operatively locked to said cam block when said head is turned in one directon, and said rollers are free from said cam faces to permit said head to turn freely in the other direction operatively disengaged from said cam block, and whereby when said cup shaped member is turned to another position on said cam block said rollers are cammed to that said head is operatively locked to said cam block when said head is turned in said other direction, and said rollers are free from said cam faces to permit said head to turn freely in said one direction operatively disengaged from said cam block.

2. A reversible wrench as defined in claim 1, wherein said end wall of said cup shaped member has a further slot therein, said cam block carrying an upstanding other pin engaged in said further slot, said control plate carrying a leaf spring arranged to engage said other pin in either of said two position of said cup shaped member to retain said member in set position on said cam block.

3. A reversible wrench as defined in claim 2, further comprising securing means for rotatably holding said cam block in said head and said control plate on said head.

4. A reversible wrench as defined in claim 3, wherein said securing means comprises an annular flange on said cam block slidably engaging the other axial end of said head.

5. A reversible wrench a defined in claim 3, wherein said cam block has an axial upstanding shaft and said cup shaped member and said control plate have respective holes for permitting one end of said shaft to extend therethrough and wherein said securing means includes an attachment element engaged with said end of said shaft outside of said control plate.

6. A reversible wrench as defned in claim 2, wherein said cam block has a plurality of cylindrically curved other faces alternating with said cam faces and having a radius of curvature substantially equal to the inside of said cylindrical wall so that said cup shaped member is guided by said cam block in rotation thereon.

7. A reversible wrench as defined in claim 6, wherein said other slot and said further slot in said end wall of said cup shaped member are curved to guide movement of the respective pins therein.

8. A reversible wrench as defined in claim 7, wherein said other slot is longer than said further slot, whereby the rotation of said cup shaped member is limited to the length of said further slot, while the rotation of said cup shaped plate is limited to the sum of the lengths of both of said curved slots.

9. A reversible wrench as defined in claim 8, further comprising a finger grip on said control plate to facilitate turning the same.

10. A reversible wrench as defined in claim 9, further comprising a tool holder integral with said cam block and extending axially from the other axial end of said head.

* * * * *